Feb. 8, 1944. G. M. KRIEGBAUM ET AL 2,341,146
MARKER
Filed June 27, 1940 3 Sheets-Sheet 1
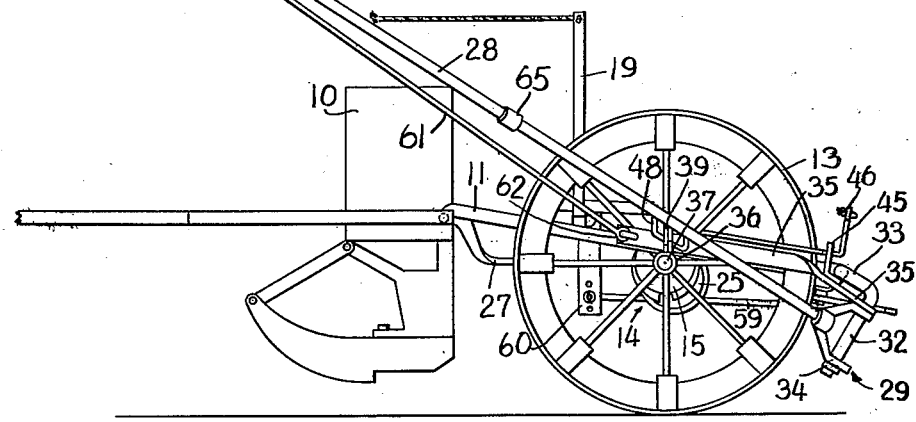
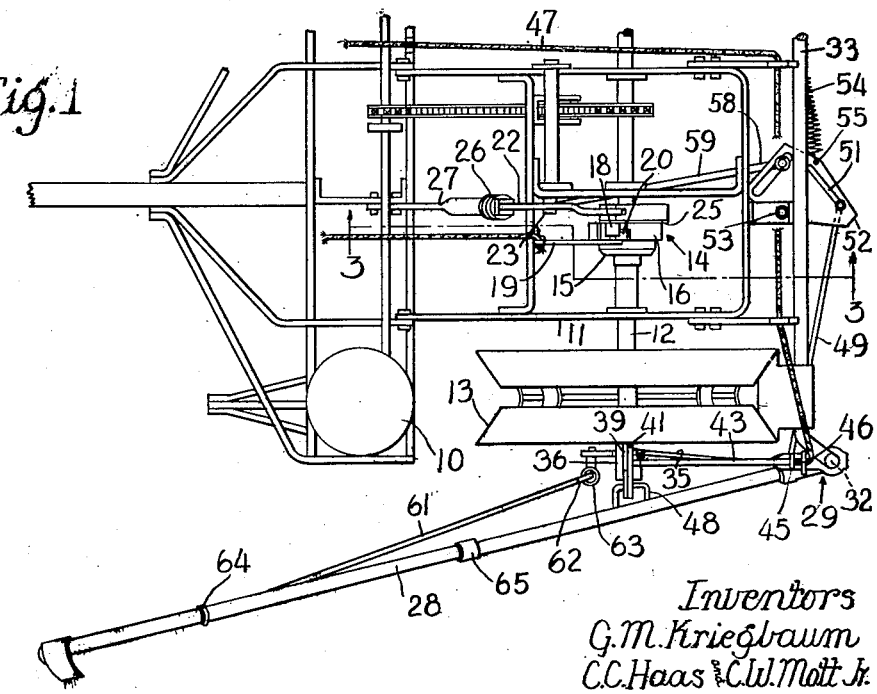

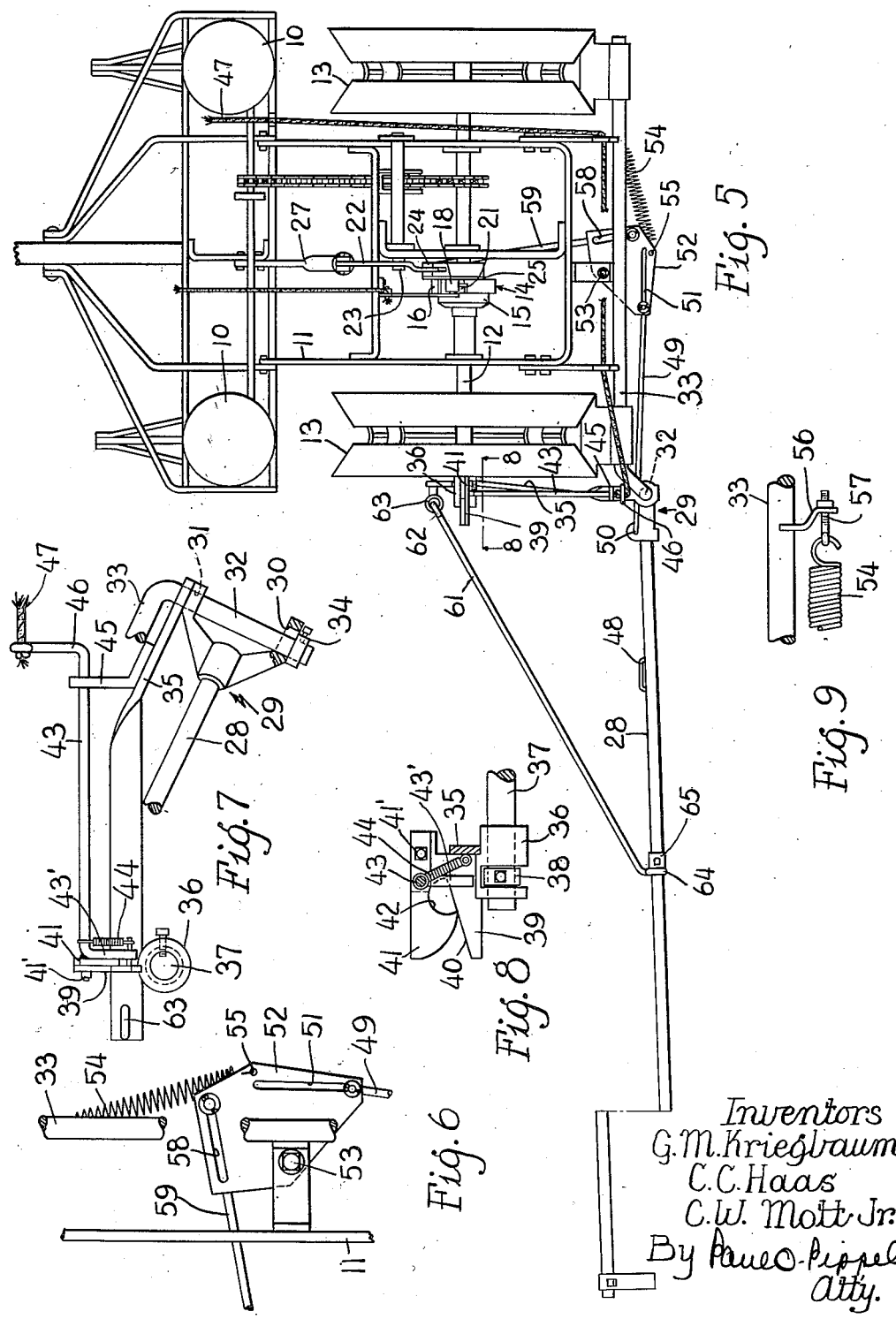

Patented Feb. 8, 1944

2,341,146

UNITED STATES PATENT OFFICE 2,341,146

MARKER

George M. Kriegbaum, Clarence C. Haas, and Carl W. Mott, Jr., Richmond, Ind., assignors to International Harvester Company, a corporation of New Jersey Application June 27, 1940, Serial No. 342,750

14 Claims. (Cl. 97—230)

This invention relates to a marker. More specifically it relates to a liftable marker for a planter.

It is well known to provide a planter with a laterally extending arm pivoted at the side of the planter, so that, when a row has been planted, the marker may be raised and the planter turned around for another row. Raising of the marker by a planter power lift or, in other words, a lift operated by rotation of the wheels of a planter, presents a problem, because the traction of the wheels may be insufficient to raise both the planter and the marker although sufficient to raise the planter alone.

An object of the present invention is the provision of an improved marker.

Another object is to provide a planter with an improved marker.

A further object is the provision of a marker on an implement which is raised by the action of an implement lift operable by rotation of the wheels of the implement.

A still further object is the provision of a marker which is raised through energy developed by lowering of an implement from a raised transport position to a lowered ground-engaging position.

Still another object is the provision of a marker on a planter which is raised automatically upon turning of the planter.

Another object is to provide on a planter a marker which is raised well above the level of the planting element.

A further object is the provision of means for facilitating the return of a marker from a raised inoperative position to an operative ground-engaging position.

According to the present invention a marker pivotally mounted at one side of a planter is raised by a spring under tension. The spring has been previously tensioned by the lowering of the planter from transport position to ground-engaging position. There is a connection including a link between the spring and the marker, and in the normal ground-engaging position, the link extends in over-center relationship from the marker so that the force applied to the link by means of lowering of the planter from transport position to normal planting position is ineffective to raise the marker. However, when the end of a row is reached, and the planter is turned toward the side from which the marker extends, the resultant change in the regular relationship of the marker and the planter changes the direction of pull by the link upon the marker and causes the marker to be raised well above the level of the planting element.

In the drawings:

Figure 1 is a plan view of one half of a planter and the improved marker of the present invention;

Figure 2 is a side view of the structure of Figure 1;

Figure 5 is a plan view similar to Figure 1, showing the marker in normal ground-engaging position;

Figure 6 is a detail view showing connections between the power lift and the marker;

Figure 7 is a side elevation showing in detail certain parts also shown in Figure 2;

Figure 8 is a sectional view, taken along the lines 8—8 of Figure 5; and,

Figure 9 is a detail, showing the connection to the planter frame of a spring employed in the lifting of the marker arm.

Figure 3:
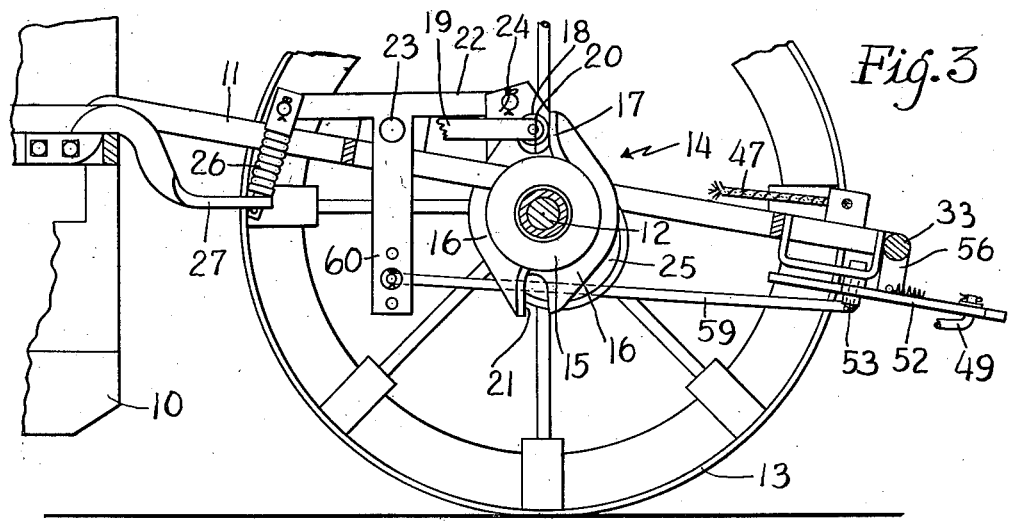
Figure 3 is on a larger scale and shows a vertical section taken along the line 3—3 of Figure 1, showing the power lift of the planter.
Figure 4:
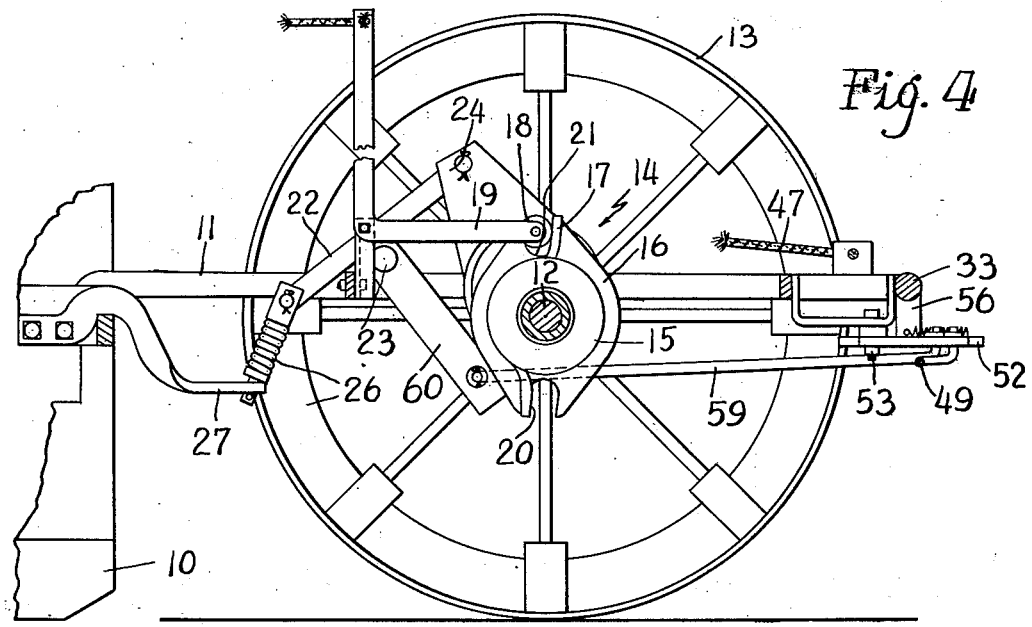
Figure 4 is a sectional view similar to Figure 3, but showing the power lift and planter in a different position.

The planter includes a pair of planting elements 10 mounted upon a frame 11 carried on an axle 12 supported in turn by planting wheels 13. As seen in Figures 3 and 4, the planting elements 10 are lifted from a ground-engaging position to a transport position by means of a power lift 14 operated by the wheels 13. This power lift is of the type shown in the patent to Graham 1,163,143 dated Dec. 7, 1915, and includes a continuously rotating member 15 secured to the shaft 12, an intermittently rotatable member 16, a single pawl 17, and a roller 18 mounted upon a lever 19 and normally positioned in recesses 20 or 21 in the intermittently rotatable member 16. A lever 22 is mounted at a mid-point 23 on the frame 11 and is pivotally connected at one end to a member 24 journaled on an eccentric 25 secured to the intermittently rotating member 16. The other end of the lever 22 is connected to a flexible member 26 connected in turn to a part 27 secured to the planter element 10. When it is desired to raise the planting elements 10 from the position of Figure 4 to the position of Figure 3, the element 19 is actuated so as to lift the roller 18 out of the recess 21 in the intermittently rotating member 16. This permits a movement of the pawl 17 in the manner disclosed in the Graham patent, so that the constantly rotating member 15 is permitted to engage the intermittently rotating member 16. Rotation of the member 16 and the attached eccentric 25 results. This causes a movement of the member 24 and a consequent swinging of the lever 22, so as to raise the planter element 10. When the intermittently rotating member 16 has passed through 180 degrees to the position of Figure 3, the roller 18 goes into recess 20 and into engagement with the pawl 17, thereby causing disengagement of the members 15 and 16. The planter elements 10 are accordingly held in the raised position of Figure 3.

As shown in Figure 5, a marker arm 28 extends laterally from the planter. The marker arm has a yoke 29 secured to the inner end thereof. The lower end of the yoke has an elongated slot 30, and the upper end has a circular opening 31. As seen in Figures 2 and 7, a generally vertical bearing portion 32 of a circular rod 33 extends through the openings 30 and 31. The rod 33 is secured at the rear of the planter frame 11. A collar 34 retains the yoke 29 on the bearing portion 32. A member 35 is secured to the bearing portion 32 and serves as an upper limit for the yoke 29. The member 35 extends forwardly and is secured, as shown in Figures 7 and 8, to a bifurcated sleeve 36 mounted on an extension 37 of the axle 12 beyond the one planting wheel 13. The sleeve 36 is held in place on the axle extension 37 by a collar 38 secured to the extension 37, which collar the sleeve embraces.

A member 39 is secured to the top of the sleeve 36 and has a sloping surface 40 adjacent its outer end. A member 41 is pivotally attached to the member 39 by means of a bolt 41' and has a notch 42 in one side which, together with the member 39, encloses a space. A rod 43 has a portion 43' at one end extending at right angles to the remainder of the rod, which portion is secured as by welding to the member 41. A spring 44 tends to keep the parts 39 and 41 in the positions shown in Figure 8. As shown in Figures 5 and 7, the rod 43 extends rearwardly and is supported at its rear end in a member 45 secured to the member 35. The rear end 46 of the rod 43 extends vertically upwardly and has a cord 47 attached thereto, which extends across the planter and then forwardly within reach of an operator, who may be at the front of the planter on a tractor, not shown. The parts 39 and 41 serve for the retention of the marker 28 in its raised position. An element 48, secured to the marker, is caused to pass between the parts 39 and 41 and be retained in the notch 42.

As seen in Figure 5, a link 49 is connected at one end at 50 to the yoke 29 and at the other end to a slot 51 in a plate 52 pivotally attached at 53 to the frame 11. By the connection at 50 the link 49 is connected to a point on the marker arm spaced from its pivot point, and by the slot 51 in the plate 52, to a point on the planter. A spring 54 is connected at one end at 55 to the plate 52 and at the other end to the under side of the rod 33 by means of a bracket 56 and an adjustable bolt and nut 57. The plate 52 also has a slot 58 in which is connected one end of a link 59, the other end being connected to a portion 60 of the lever 22 extending generally at right angles to the main portion of the lever.

Movement of the marker arm 28 rearward from the position of Figure 5 is resisted by a member 61 connected at one end by a loop 62 to a ring 63 secured to the member 35, and at its other end to the marker arm by a loop 64 abutting a shoulder 65 on the marker arm.

As shown in Figure 5, the spring 54 is under tension so that it should exert a pull tending to raise the marker arm 28. However this is prevented, because the link 59 connected with the power lift resists angular movement of the plate 52, and because any pull by the spring 54 through the link 49 is approximately in the direction of the marker arm and through its pivot on the planter frame and is ineffective. When the end of one planting row has been reached, the planter is turned, so that a new planting row may be begun again in the opposite direction. Turning will be to the left as viewed in Figure 5 toward the marker 28. The result is a forward movement of the arm 28 with respect to the planter. When the forward movement of the marker 28 has proceeded to a sufficient degree, the angular relationship of the link 49 with respect to the marker 28 has changed, and the direction of the pull upon the marker by the link 49 is such as to be effective to raise the marker arm to the position shown in Figure 1. In the meantime, the operator will have caused the power lift to raise the planting elements 10 from the position in Figure 4 to that in Figure 3 with a resultant angular movement of the portion 60 of the lever 22 and a forward movement of the link 59. This means that the link 59 no longer engages the rear end of the slot 58, and consequently the spring 54 may move the plate 52 angularly so as to cause the link 49 to raise the marker 28.

The raised position of the marker will be as shown in Figures 1 and 2, the marker being held in raised position by the engagement of the element 48 on the marker 28 in the slot 42 in the member 41. In this position the arm extends forwardly well above the planting elements 10 by being held above the axle extension 37. In this elevated position it cannot interfere with the outside planting element or any mechanism connected therewith such as a check wire, check wire guides, or tripping mechanism.

When the planter has been turned around so as to be ready for another row, the planting elements 10 are lowered from the position in Figure 3 to that in Figure 4. The result is a rearward movement of the link 59 and a consequent angular movement of the plate 52 because of abutment of the link 59 with the rear end of the slot 58 in the plate 52. The resultant angular movement of the plate 52 causes a tensioning of the spring 54, which supplies the force for raising the marker 28 at the end of another row. After the planter elements 10 have been lowered and the spring 54 put under tension, the cord 47 is actuated so as to cause an angular movement of the plate 41. Accordingly the element 48 is released from the slot 42 and the weight of the marker causes the marker to slide down the inclined surface 40 of the element 39, the marker being given an initial push by the portion 43' of the rod 43. Forward motion of the planter brings the marker again to the position of Figure 5.

In the operation of the planter just described, it has been stated that the marker arm 28 is employed for marking during the planting of one row and then again for marking during the planting of the adjacent row. This has been for the purpose of description only. In actual practice a planter will probably have two marker arms like the marker arm 28 just described, but extending from opposite sides of the planter so that, during operation, first one marker will be used for one row, and then the other marker used for the adjacent row.

It will be apparent from the foregoing description that a new and novel marker for an implement has been devised. The marker has been illustrated for use with a planter, but it may obviously be used for other implements. Turning of the planter is effective to change the angular relationship of the marker with the planter sufficiently to allow a force constantly applied to the marker arm by means of a link to be effective to raise the marker. The tensioning of a spring which supplies the force for raising the marker arm is effected by lowering of planting elements from a transport position to a ground position. In its raised position the marker arm is well above the planting elements and, consequently, will not interfere with the outside planting element or any mechanism connected therewith. Return of the marker from raised inoperative position to ground-engaging position is facilitated by means connected with the holder for maintaining the marker in raised position, which means give the marker an initial push toward ground-engaging position.

The intention is to limit the invention only within the terms of the appended claims.

What is claimed is:

1. In combination, an implement frame, a marker pivotally mounted thereon and extending outwardly therefrom in operative ground-engaging position, and means for holding the marker in inoperative position in which it extends upwardly from its connection with the frame, said means comprising a first member secured to the frame and having a sloping surface, and a second member movably connected with the first member for enclosing a space to hold the marker, the said second member carrying a part for urging the marker down the sloping surface of the first member upon release from the space enclosed by the members.

2. The structure specified in claim 1, the said part comprising a portion of a rod secured to the said second member, the remainder of the rod extending away from the second member at a substantial angle to the said portion of the rod so as to form a remote control for moving the second member with respect to the first member.

3. In combination, a planter frame, a wheel, an axle connecting the frame and the wheel and extending outwardly beyond the wheel, a marker pivotally mounted on the frame so as to extend outwardly therefrom in its normal ground-engaging position, and means for holding the marker in inoperative raised position, said means comprising a first member mounted on the extension of the axle beyond the wheel and having a sloping surface, a second member pivotally connected to the first member and enclosing a space therewith, and a rod having a portion secured to the second member for urging the marker down the sloping surface of the first member upon release from the space enclosed by the members and the remainder extending away from the second member at a substantial angle to the said portion and constituting a remote control for the second member.

4. In combination, an implement adapted to move in a certain direction over the ground, a marker pivotally connected to the implement so as to be movable from an operative position in which it extends at a substantial angle to the direction of movement of the implement with the other end of the marker in contact with the ground to an inoperative position in which it extends at a smaller angle to the direction of movement of the implement than in the operative position, and force-exerting means connecting a point on the marker spaced from its pivot on the implement and a point on the implement generally in line with the pivot and the said point on the marker when in operative position and acting to urge the one point toward the other by force passing substantially through the pivot point, whereby a turn of the implement toward the side toward which the marker extends in operative position causes a movement of the marker from operative position toward inoperative position so as to cause the force-exerting means to act on a line sufficiently displaced from the pivot point of the marker so as to force the marker into inoperative position.

5. In the combination specified in claim 4, the implement being shiftable from a transport position to a working position, the combination further including means connecting the implement and the force-exerting means for causing the shifting of the implement from one position to the other to supply to the force-exerting means the energy necessary for moving the marker into inoperative position.

6. In the combination specified in claim 4, the implement being shiftable from a lowered working position to a raised transport position, the combination further including means connecting the implement and the force-exerting means for causing the lowering of the implement from transport position to working position to supply to the force-exerting means the energy necessary for moving the marker into inoperative position.

7. In the combination specified in claim 4, the implement being shiftable from a transport position to a working position, the force-exerting means including a spring, the combination further including means connecting the implement and the spring for causing to be stored in the spring energy expended by shifting of the implement from one position to the other, which energy is utilized for shifting the marker into inoperative position.

8. In combination, an implement shiftable from a transport position to a working position, a marker movably connected to the implement so as to be shiftable from an operative position to an inoperative position, force-exerting means connecting the implement and the marker for moving the marker from one position to another, and means connecting the implement and the force-exerting means for causing shifting of the implement from one position to the other to supply to the force-exerting means the energy necessary for shifting the marker from one position to the other.

9. In combination, an implement shiftable from a raised transport position to a lowered working position, a marker movably connected to the implement so as to be shiftable from an operative position to an inoperative position, force-exerting means connecting the implement and the marker for moving the marker from one position to another, and means connecting the implement and the force-exerting means for causing lowering of the implement from transport position to working position to supply to the force-exerting means the energy necessary for shifting the marker from one position to the other.

10. In combination, an implement shiftable from a transport position to a working position, a marker movably connected to the implement so as to be shiftable from an operative position to an inoperative position, force-exerting means connecting the implement and the marker for moving the marker from one position to another, and means connecting the implement and the force-exerting means for causing shifting of the implement from one position to the other to supply to the force-exerting means the energy necessary for shifting the marker from operative position to inoperative position.

11. In combination, an implement shiftable from a raised transport position to a lowered working position, a marker movably connected to the implement so as to be shiftable from an operative position to an inoperative position, force-exerting means connecting the implement and the marker for moving the marker from one position to another, and means connecting the implement and the force-exerting means for causing lowering of the implement from transport position to working position to supply to the force-exerting means the energy necessary for shifting the marker from operative position to inoperative position.

12. In the combination specified in claim 8, the force-exerting means including a spring in which is stored the energy expended by shifting of the implement from one position to the other and employed for shifting the marker from one position to the other.

13. In combination, a planter, means for lifting the planter comprising a continuously rotating member and an intermittently rotating member, a marker arm pivoted on the planter, a spring connected at one end to an element having a pair of slots, means connecting the element at one slot and a point on the marker arm spaced from its pivot, means connecting the intermittently rotating member of the planter-lifting means and the element at the other slot, a spring, means connecting one end of the spring and the planter, and means connecting the other end of the spring and the element.

14. In combination, a planter, means for lifting the planter comprising a continuously rotating member and an intermittently rotating member, a marker arm pivotally mounted on the planter and adapted to extend in a certain direction in ground-engaging position, a plate pivotally mounted on the planter and having a first slot substantially in line with the marker in ground-engaging position and a second slot extending substantially at right angles to the first slot, a link connecting the element at the first slot and a point on the marker arm spaced from its pivot point, means including a link connecting the element at the other slot and the intermittently rotating member of the planter-lifting means, a spring, means connecting one end of the spring and the planter, and means connecting the other end of the spring and the plate.

GEORGE M. KRIEGBAUM.
CLARENCE C. HAAS.
CARL W. MOTT, JR.